E. D. TILLYER.
MOTION PICTURE PROJECTION APPARATUS.
APPLICATION FILED MAR. 27, 1917.
1,385,162.
Patented July 19, 1921.
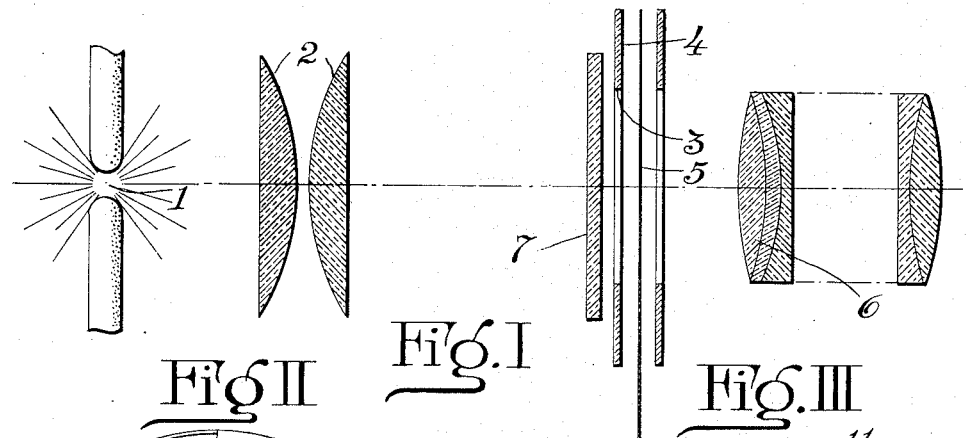
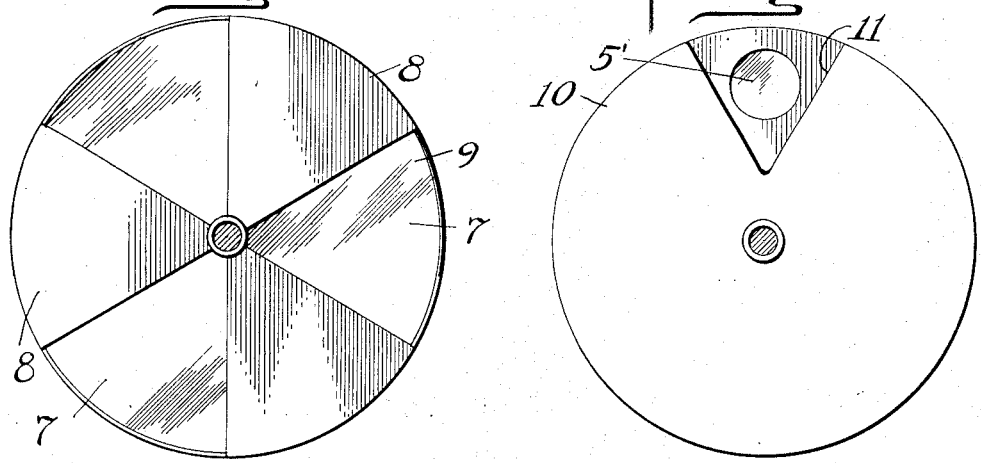
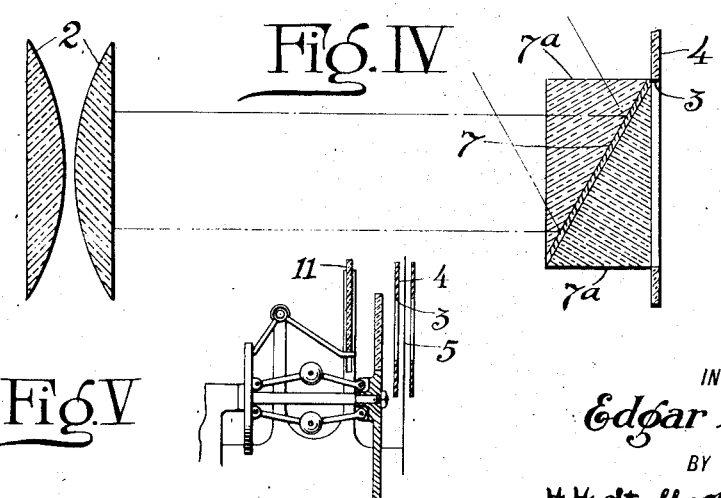
INVENTOR
Edgar D. Tillyer
BY
H. H. Styll, A. K. Parsons
ATTORNEYS

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

MOTION-PICTURE-PROJECTION APPARATUS.

1,385,162.     Specification of Letters Patent.     Patented July 19, 1921.

Application filed March 27, 1917. Serial No. 157,595.

*To all whom it may concern:*

Be it known that I, EDGAR D. TILLYER, a citizen of the United States, residing at Southbridge, in the county of Worcester and State of Massachusetts, have invented certain new and useful Improvements in Motion-Picture-Projection Apparatus, of which the following is a specification.

My invention relates to improvements in motion picture apparatus and has particular reference to improved means for preventing over-heating or ignition of the film on account of the intensity of the beam of light projected therethrough.

A further object of the present invention is the provision of a picture machine which may be run at any desired rate of speed, and in which the production of the film will be positive and satisfactory when the film is running at a slow rate of speed, as well as when at a high rate of speed.

A further object of the present invention is the provision of an attachment for a motion picture projection apparatus or the like which will enable the same to be used for stationary projection or projection of stationary pictures as well as of moving films, if desired.

Other objects and advantages of my improved construction should be readily apparent by reference to the following specification taken in connection with the accompanying drawings forming a part thereof, and it will be understood that I may make any modifications in the specific details of construction shown and 'described within the scope of the appended claims without departing from or exceeding the spirit of my invention.

Figure I represents diagramatically a picture projection apparatus equipped with my improvement.

Fig. II represents a detail view of the shutter.

Fig. III represents a view of the protecting screen in connection with the shutter.

Fig. IV diagrammatically illustrates a possible modification of my invention.

Fig. V represents diagrammatically another form of my invention.

In the drawings, the numeral 1 designates the arc or other source of illumination having disposed adjacent thereto the regular condensing lenses 2, projecting a beam of light as through the aperture 3 in the shield 4 onto the moving film 5, and thence through the projection lenses 6.

At the present time so far as I am aware it is necessary in motion picture machines that the film be run at a certain predetermined speed and that the machine be equipped with automatic devices for dropping a shutter over the aperture 5′ when the speed falls below the prescribed minimum to prevent ignition of the film on account of the intense heat radiation traveling in the condensed beam of projecting light. The machine is, therefore, at all times subject to a fire risk should it slow down and the automatic device fail to operate, while it is impossible to slow down or stop the movement of the film as would frequently prove desirable in connection with educational films or the like in which some particular parts should be given especial consideration.

In the carrying out of my invention in its more simple form, I interpose adjacent the shield member 4 the heat shield 7 of transparent material, which may have either the power of absorption or the power of reflection in infra red rays while transmitting a high percentage of the visible radiation.

Examples of suitable glass or the like for use as the heat shield 7, will be found in *Technologic Papers of the Bureau of Standards* No. 93, dated November 14, 1916, particular attention being invited to the sage green glass described on page 5, and the gold-plated glass on page 7, the one forming an example of an infra-red absorbing and the other of an infra-red reflecting glass or screen member.

While this screen member 7 may be formed of either reflecting or absorbing glass or the like, I have found that in the event that a reflecting member is employed it is ordinarily desirable that the heat rays be laterally deflected rather than passing back through the condenser and other lenses, or in other words, that the parts be arranged substantially as indicated in Fig. IV, in which I have shown the shield member as comprised of the pair of similar oppositely disposed prisms 7ᵃ having between them the heat reflecting medium 7, the prisms thus preventing deflection or distortion of the beam of light, while permitting of the lateral reflection of the heat rays.

In the preferred form of my invention, however, I make use of a construction such as illustrated in Fig. II for example, in which I have shown the rotating shutter of a motion picture projecting machine or the like, said shutter having the usual solid portion 8 and the projecting apertures 9, these apertures, however, having mounted therein the sheets 7 of heat absorbing light transmitting material, the effect thus being that at all times when the light passes through the projection controlling shutter onto the film or member 5, it is intended to protect, the light will pass, not as is customary through an open space, but through the media 7, so that the heat will be absorbed by the said media and prevented from reaching the member 5. At the same time the mounting of the media 7 serves a second purpose, in that during the projection three different sections of the media 7 alternately receive the heat rays and then move to one side, this motion being at a rapid rate so that the members 7 are constantly cooled by the spinning action of the shutter and prevented from over-heating on account of their absorption of the heat rays, and at the same time serve to satisfactorily and efficiently prevent the heat rays from reaching the film 5.

It will, of course, be understood that if preferred the member 7 could be stationary, in which event, however, it would be desirable that a suitable draft or current of air be created passing over the member to prevent undue heating of it.

It will, of course, be understood that a projection instrument embodying my improvement would be provided with the usual screen members or baffle plates 10, having the V notch or the like 11 therein, in line with the aperture 5', through which the light passes, the shutter member being disposed behind this plate 10, and consequently normally protected from any heat rays in giving it greater opportunity for cooling during rotation, than would be the case were this plate not present.

From the foregoing specification taken in connection with the drawings, the advantages of my improvement should be at once apparent, and it will be seen that by the use of it I am able to entirely eliminate fire risk or liability of ignition of the film through the heat radiations contained in the projected beam of light, and at the same time am able to render the cost of the projection instrument itself much less, in that I do away with automatic shutters, controls and the like for cutting off the beam of light upon reduction of the speed of movement of the film, and am also able to provide a device in which the film may be halted at any desired portion thereof continuously projected on the screen, an impossibility with present constructions of motion picture apparatus, and am able to accomplish these results in a simple, inexpensive, yet efficient manner, and preferably so combine my heat absorbing media or the like with the projection shutter itself so as to add no new parts to the projector, while eliminating certain of its old parts and utilize the rotation of the shutter itself for cooling of the heat absorbing media.

In addition it will be seen that my invention is capable of employment as illustrated in Fig. V, for both moving and stationary picture projections, in that the fire shutter 11 may itself be formed of light transmitting but heat absorbing or reflecting material, so that when the machine is stopped, as when it is desired to temporarily project a certain view for study, as in the case of educational films or the like, that the dropping of the fire shutter will not shut off the light entirely but will allow a sufficient amount to pass therethrough to satisfactorily project the picture while the material of the screen will prevent passage of the heat rays and thus eliminate all possibility of burning of the film. It will be understood that this shutting off of illumination may be readily accomplished in that the actual illumination thus secured will be substantially that of constant illumination on the screen during the projection of moving pictures, in that there will be no intermittent shutting off of the light by the opaque portion 8 of the motion picture shutter, as occurs in their projection.

I claim:

1. In a device of the character described in combination with the light and the object to be projected, of a transparent heat retarding solid media interposed in inclined position in the path of the light between the light and the object, and having the property of selectively retarding the infra-red radiations and of transmitting a relatively high percentage of visible radiations the inclined position of the said media deflecting the retarded heat rays out of the path of the original light rays.

2. In a projecting machine in combination with the light and the object to be projected, a shutter between the light and the object, having a light transmitting aperture formed therein, of a transparent solid heat retarding member mounted in said aperture and having the property of selective retardance of the heat radiations and the transmission of visible radiations.

3. In a projection apparatus, the combination with a source of illumination and an object to be projected, of a solid transparent heat screen and means for intermittently interposing the transparent heat screen between the source of illumination and the object to be projected, said screen having the property of selectively retarding the heat radiations and of transmitting a high percentage of the visible radiations.

4. A shutter for a projecting machine comprising a base member of opaque material having a plurality of apertures formed therein and solid transparent heat screens mounted in the apertures, said screens having the property of selective retardance of the heat rays and transmission of high percentage of visible rays.

In testimony whereof I affix my signature in the presence of two witnesses.

E. D. TILLYER.

Witnesses:
H. K. PARSONS,
J. JOSEPH MACCARTHY.